Oct. 2, 1923.
F. J. KRISTOFEK
CREAM SEPARATOR
Filed June 24, 1921
1,469,221
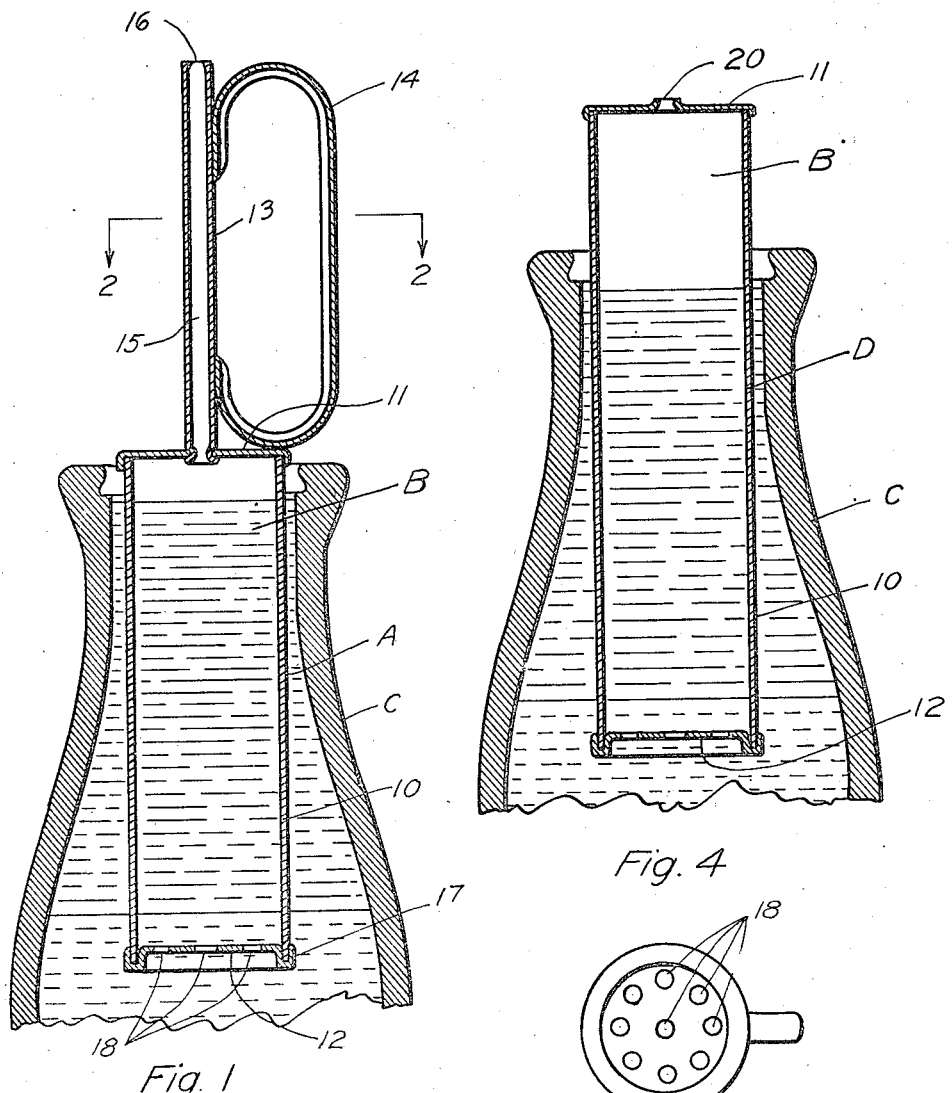
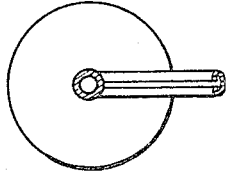
Inventor:
Frank J. Kristofek,
by: Howard Fischer
his Attorney Patented Oct. 2, 1923.

1,469,221

UNITED STATES PATENT OFFICE.

FRANK J. KRISTOFEK, OF ST. PAUL, MINNESOTA, ASSIGNOR TO BROWN & BIGELOW, OF ST. PAUL, MINNESOTA, A CORPORATION OF MINNESOTA.

CREAM SEPARATOR.

Application filed June 24, 1921. Serial No. 480,169.

*To all whom it may concern:*

Be it known that I, FRANK J. KRISTOFEK, a citizen of the United States, residing at St. Paul, in the county of Ramsey and State of Minnesota, have invented a new and useful Improvement in Cream Separators, of which the following is a specification.

My invention relates to a cream separator which is designed to be used in connection with milk bottles for removing the cream from the top of the milk without disturbing the contents of the bottle to the extent of mixing the cream with the milk. The same is designed so that it can be held conveniently in the hand while being inserted in the neck of the bottle to the depth of the cream. After the insertion of the separator into the bottle by holding the outer end of the separator closed with the finger the cream which has entered the separator will remain therein and can be readily removed from the bottle.

The invention includes means adapted to form a receptacle which is designed to freely receive liquid such as cream, through openings formed in the bottom of the separator while the other end is open. When the chamber of the separator is inserted into the cream to the depth desired it is closed on the upper end with the finger, the openings on the inner end thereof are such as to prevent the cream from being discharged out of the separator. In this manner the cream can be practically entirely removed from the milk bottle without extensively disturbing or mixing the milk. It is an essential detail of the invention that the openings in the lower end of the separator be so arranged and of such proportions as to prevent the cream from being discharged so that the separator can hold the cream within itself by vacuum when its upper end is closed. When the upper end of the separator is opened the cream or liquid held therein will be readily discharged out of the lower end of the same.

In the drawings forming a part of this specification:

Figure 1 is a side sectional elevation of my separator illustrating the upper portion of a milk bottle also in section.

Figure 2 is a view on the line 2—2 Figure 1.

Figure 3 is a bottom view of the separator illustrated in Figure 1.

Figure 4 illustrates a modified form of the invention showing the cream separator inserted in a milk bottle positioned to remove the cream.

The drawings illustrate a cream separator A which is formed with a cylindrical body portion 10 having an upper end wall 11 and a lower end 12.

The upper end 11 is secured to the cylindrical portion 10 to form an air-tight joint and is provided with a tube 13 which extends from the end 11. A handle member 14 is secured to the cover or end 11 and the tubular member 13. The tubular member 13 forms a passageway 15 into one end of the cylindrical member 10. This passageway can be closed by pressing the finger on the open end 16 of the same to make one end of the chamber B of the separator A airtight.

The member or end 12 is formed cupshaped in a manner to position the wall of the same within the chamber B inward from the end of the cylindrical member 10 while the edge 17 of the same extends around and over the edge of the member 10 so that an air-tight joint can be formed between the edges of the member 10 and the member 12 without forming an enlarged ridge on the outer surface of the member 10 to which the cream or other liquid would adhere if the lower edge of the separator A was not smooth. With this construction only the thickness of the metal or members forming the separator A project from the lower edge of the same.

The member 12 is formed with a series of openings 18 which are positioned and proportioned in size to form the desired vacuum within the chamber B when the end 16 of the tubular member 13 is closed to hold a liquid of the consistency of cream within the separator chamber B so that it can be removed from a milk bottle or other receptacle. Thus the vacuum in the chamber B of the separator A holds the cream from running out of the openings 18 while the separator is withdrawn from the bottle C and this operation can be repeated until practically all of the cream is withdrawn from the bottle without materially disturbing the milk.

A feature of this invention resides in the simplicity of the device and in its design which allows the readily visible cream in an ordinary milk bottle to be withdrawn with a very little mixing of the cream with the skim milk. The greater portion of the cream is removed in the first operation and if it is desired to remove the remaining amount of cream from the milk it is only necessary to repeat the first operation. The handle 14 provides means by which the separator may be firmly and conveniently held in the hand while one finger can be used to close the opening 16.

The separator D illustrated in Figure 4 is formed with a cylindrical body portion 10 and upper and lower ends 11 and 12. This separator is not provided with the handle or tubular member 13 but has an opening 20 in the end 11 which is adapted to be closed by one's finger after the separator is inserted the desired depth into the cream in the bottle C and to form the necessary vacuum within the chamber B to hold the cream in the separator D while it is being removed from the bottle.

The separator D operates in the same manner as the separator A, but being more simplified in not having the handle or tubular member which projects from the upper end of the separator A. In using this separator it is engaged at its upper end and after having been inserted to the desired depth into the cream the opening 20 is closed with the finger while withdrawing it from the milk bottle.

Obviously a cream separator of this nature forms a desirable house utility, particularly as the majority of the milk delivered to the householder is in bottles. For sanitary reasons it is not desirable to remove the cream from the bottle until it is wanted for use. With my separator the householder can remove the cream very quickly from the bottle at any time, and it is so constructed that it can be sterilized after it is used, thus doing away entirely with the awkward method which is now necessary to try and separate the cream from the milk in removing it from an ordinary milk bottle.

In accordance with the patent statutes I have described the principles of operation of my invention together with the apparatus which I now consider to represent the best embodiment thereof, but I wish to have it understood that I desire to protect my invention within the scope of the following claims:

1. A cream separator including a cylindrical hollow body portion, a disk-like end wall secured to one end thereof, an opening formed in said wall, a perforated disk-like wall spaced from the other end of said body portion to position it within the end of said body portion in a manner to form a recess in that end of said cream separator, whereby cream is adapted to be directed into the perforations of said inset end in the area covered by said end.

2. A cream separator comprising a cylindrical body portion, a disk adapted to close one end of said body having a single opening therein, a perforated disk member spaced within the other end of said body and means formed on said perforated disk adapted to hold the same spaced from the end of said body portion of said separator to form a recess at the receiving end of said separator.

FRANK J. KRISTOFEK.